US009703707B2

(12) United States Patent
Falsafi et al.

(10) Patent No.: US 9,703,707 B2
(45) Date of Patent: Jul. 11, 2017

(54) NETWORK-ON-CHIP USING REQUEST AND REPLY TREES FOR LOW-LATENCY PROCESSOR-MEMORY COMMUNICATION

(71) Applicant: ECOLE POLYTECHNIQUE FEDERALE DE LAUSANNE (EPFL), Lausanne (CH)

(72) Inventors: Babak Falsafi, Chexbres (CH); Boris Grot, Lausanne (CH); Pejman Lotfi Kamran, Chavannes-Renens (CH)

(73) Assignee: Ecole Polytechnique Fédérale de Lausanne (EPFL), Lausanne (CH)

( * ) Notice: Subject to any disclaimer, the term of this patent is extended or adjusted under 35 U.S.C. 154(b) by 804 days.

(21) Appl. No.: 13/693,399

(22) Filed: Dec. 4, 2012

(65) Prior Publication Data

US 2014/0156929 A1    Jun. 5, 2014

(51) Int. Cl.
*G06F 13/00* (2006.01)
*G06F 12/0811* (2016.01)
*G06F 12/0813* (2016.01)
*G06F 15/78* (2006.01)

(52) U.S. Cl.
CPC ...... *G06F 12/0811* (2013.01); *G06F 12/0813* (2013.01); *G06F 15/7825* (2013.01)

(58) Field of Classification Search
None
See application file for complete search history.

(56) References Cited

U.S. PATENT DOCUMENTS

| 6,978,425 | B1* | 12/2005 | Raghunathan | G06F 17/505 703/23 |
|---|---|---|---|---|
| 2006/0248287 | A1* | 11/2006 | Buyuktosunoglu | G06F 12/0833 711/146 |
| 2009/0024799 | A1* | 1/2009 | Jahagirdar | G06F 1/3203 711/130 |
| 2011/0010525 | A1* | 1/2011 | Binkert | G06F 15/7825 712/29 |

OTHER PUBLICATIONS

Kim, Low-Cost router Microarchitechture for on-chip networks, Microarchitecture, 2009. MICRO-42. 42nd Annual IEEE/ACM International Symposium, Dec. 12-16, 2009, pp. 255-266.*
Kim et al, Flattened Butterfly Topology for on-chip networks, IEEE Computer Architecture Letters, vol. 6, No. 2, Jul.-Dec. 2007.*

(Continued)

*Primary Examiner* — Ryan Bertram
*Assistant Examiner* — Jason Blust
(74) *Attorney, Agent, or Firm* — Nixon & Vanderhye P.C.

(57) ABSTRACT

A NOC comprises a die having a cache and a core area, a plurality of core tiles arranged in the core area in a plurality of subsets, at least one cache memory bank arranged in the cache area, whereby the at least one cache memory bank is distinct from each of the plurality of core files. The NOC further comprises an interconnect fabric comprising a request tree to connect to a first cache memory bank of the at least one cache memory bank, each core tile of a first one of the subsets, the first subset corresponding to the first cache memory bank, such that each core tile is connected to the first cache memory bank only, and a reply tree to connect the first cache memory bank to each core tile of the first subset.

13 Claims, 6 Drawing Sheets

(56) References Cited

OTHER PUBLICATIONS

Bakhoda, Ali, et al., "Throughput-Effective On-Chip Networks for Manycore Accelerators," International Symposium on Microarchitecture, 2010, pp. 421-432.
Balfour, James, et al., "Design Tradeoffs for Tiled CMP On-Chip Networks," International Conference of Supercomputing, Jun. 2006, pp. 187-198.
Ferdman, Michael, et al., "Clearing the Clouds: A Study of Emerging Scale-Out Workloads on Modern Hardware," International Conference on Architectural Support for Programming Languages and Operating Systems, Mar. 2012, 11 pages.
Grot, Boris, et al., "Kilo-NOC: A Heterogeneous Network-on-Chip Architecture for Scalability and Service Guarantees," International Symposium on Computer Architecture, Jun. 2011, pp. 268-279.
Hardavellas, Nikos, et al., "Database Servers on Chip Multiprocessors: Limitations and Opportunities," Conference on Innovative Data Systems Research, 2007, pp. 79-87.
Hardavellas, Nikos, et al., "Reactive NUCA: Near-Optimal Block Placement and Replication in Distributed Caches," International Symposium on Computer Architecture, 2009, pp. 184-195.
Huh, Jaehyuk, et al., "A NUCA Substrate for Flexible CMP Cache Sharing," International Conference on Supercomputing, 2005, pp. 31-40.
Kahng, Andrew B., et al., "ORION 2.0: A Fast and Accurate NoC Power and Area Model for Early-Stage Design Space Exploration," Design, Automation, and Test in Europe, Apr. 2009, pp. 423-428.
Kim, John, "Low-Cost Router Microarchitecture for On-Chip Networks," International Symposium on Microarchitecture, 2009, pp. 255-266.
Kim, John, et al., "Flattened Butterfly Topology for On-Chip Networks," International Symposium on Microarchitecture, Dec. 2007, pp. 172-182.
Michelogiannakis, George, et al., "Elastic-Buffer Flow Control for On-Chip Networks," International Symposium on High-Performance Computer Architecture, Feb. 2009, pp. 151-162.
Moscibroda, Thomas, et al., "A Case for Bufferless Routing in On-Chip Networks," International Symposium on Computer Architecture, 2009, pp. 196-207, 2009.
Muralimanohar, Naveen, et al., "Optimizing NUCA Organizations and Wiring Alternatives for Large Caches with CACTI 6.0," International Symposium on Microarchitecture, Dec. 2007, pp. 3-14.
Volos, Stavros, et al., "CCNoC: Specializing On-Chip Interconnects for Energy Efficiency Cache-Coherent Servers," International Symposium on Networks-on-Chips, 2012, 8 pages.
Wang, Hangsheng, et al., "Power-driven Design of Router Microarchitectures in On-chip Networks," International Symposium on Microarchitecture, Dec. 2003, pp. 105-116.
Wenisch, Thomas F., et al., "SimFlex: Statistical Sampling of Computer System Simulation," IEEE Micro, vol. 26, Jul.-Aug. 2006, pp. 18-31.

* cited by examiner

NETWORK-ON-CHIP USING REQUEST AND REPLY TREES FOR LOW-LATENCY PROCESSOR-MEMORY COMMUNICATION

TECHNICAL FIELD

The present invention relates to many-core processor organizations such as the ones used in servers which enable high throughput thanks to abundant request-level parallelism.

BACKGROUND

Emerging server workloads benefit from many-core processor organizations that enable high throughput thanks to abundant request-level parallelism. A key characteristic of these workloads is the large instruction footprint that exceeds the capacity of private caches. While a shared last-level cache (LLC) can capture the instruction working set, it necessitates a low-latency interconnect fabric to minimize the core stall time on instruction fetches serviced by the LLC. Today's many-core processors with a mesh interconnect sacrifice performance on server workloads due to Network-On-Chip (NOC)-induced delays. Low-diameter topologies can overcome the performance limitations of meshes through rich inter-node connectivity, but at a high area expense.

SUMMARY OF INVENTION

To address the drawbacks of existing NOC architectures, the present invention introduces a NOC-Out—an interconnect fabric optimized for the bilateral core-to-cache communication dominant in server applications.

In a first aspect the invention provides a Network-On-Chip (NOC) organization comprising a die having a cache area and a core area, a plurality of core tiles arranged in the core area in a plurality of subsets, at least one cache memory bank arranged in the cache area, whereby the at least one cache memory bank is distinct from each of the plurality of core tiles. The NOC organization further comprises an interconnect fabric comprising a request tree to connect to a first cache memory bank of the at least one cache memory bank, each core tile of a first one of the subsets, the first subset corresponding to the first cache memory bank, such that each core tile of the first subset is connected to the first cache memory bank only, and allow guiding data packets from each core tile of the first subset to the first cache memory bank, and a reply tree to connect the first cache memory bank to each core tile of the first subset, and allow guiding data packets from the first cache memory bank to a core tile of the first subset.

In a first preferred embodiment of the NOC organization each subset of core tiles corresponds to only one cache memory bank.

In a second preferred embodiment of the NOC organization, in case two or more cache memory banks are present, the cache memory banks are connected among themselves.

In a further preferred embodiment of the NOC organization, the cache memory banks are connected among themselves by means of a flattened butterfly network architecture.

In a third preferred embodiment of the NOC organization, the request tree comprises a plurality of request nodes, each one of which is a two-input multiplexer that merges data packets from the first input and the second input and outputs a multiplexed stream of data packets.

In a fourth preferred embodiment of the NOC organization, at a first request node, a first two-input multiplexer comprises means to receive first data packets from a first core tile at its first input, a first multiplexed stream of data packets at its second input, from a second two-input multiplexer located at a second request node, and means to output a resulting stream of data packets to the first cache memory bank. At the second request node, the second two-input multiplexer comprises means to receive second data packets from a second tile at its first input, a second multiplexed stream of data packets at its second input, from a third two-input multiplexer located at a third request node, or third data packets from a third core tile at its second input, depending on the case if the first subset comprises more than three core tiles or not, and means to output the first multiplexed stream of data packets.

In a fifth preferred embodiment of the NOC organization, each two-input multiplexer comprises means to implement a static-priority arbitration policy that prioritizes the output of the data packets received at the first input over the data packets received at the second input.

In a sixth preferred embodiment of the NOC organization, the reply tree comprises a plurality of reply nodes, each one of which is a single input demultiplexer that demultiplexes an input multiplexed stream of data packets and propagates a data packet therefrom to a first output connected to one of the core tiles of the first subset if the packet has reached its destination or propagates it to a second output otherwise.

In a seventh preferred embodiment of the NOC organization, this comprises at a first reply node, a first single input demultiplexer which comprises means to receive a first reply multiplexed stream of data packets from the first cache memory bank, and means to determine whether a packet in the first reply multiplexed stream has reached its destination at the first reply node, whereby the destination corresponds to the core tile connected to the first output, means to output the packet to the first output if the packet has reached its destination, means to multiplex the remaining packets in a second reply multiplexed stream, and means to output the second reply multiplexed stream to the second output. At a second reply node, is comprised a second single input demultiplexer, which is configured in a similar manner as the first single input demultiplexer notably with respect to a further core tile connected to its first output, and either a third single input demultiplexer or an even further core tile connected to its second output depending on the case if the first subset comprises more than three core tiles or not.

In an eighth preferred embodiment of the NOC organization, each single input demultiplexer comprises means to implement a static-priority reply arbitration policy that prioritizes the output of the data packets received at the single input.

In a ninth preferred embodiment of the NOC organization, the cache area divides a total area of the die in two substantially equally sized areas, and the core area is located in the two substantially equally sized areas hence surrounding the cache area.

In a tenth preferred embodiment of the NOC organization, the cache area has a rectangular shape in which the at least one cache memory banks are aligned according to the elongated direction of the rectangular shape, and for each subset, the core tiles making up the subset at aligned along a direction perpendicular to the elongated direction of the rectangular shape.

In an eleventh preferred embodiment of the NOC organization, the cache area corresponds to central area located substantially in the geometrical middle of the die.

A unique feature of NOC-Out is its use of tree-based topologies, which afford the performance of low-diameter networks at the cost of a mesh interconnect. A detailed evaluation in the context of a 64-core CMP reveals that NOC-Out matches the performance of a flattened butterfly on a range of server workload while reducing the NOC area by a factor of 9. Compared to a mesh, NOC-Out improves system performance by 17% and reduces network area by 28%.

BRIEF DESCRIPTION OF THE FIGURES

A more detailed description of the invention will now be given by making use of the following figures and table.

Figure 1:
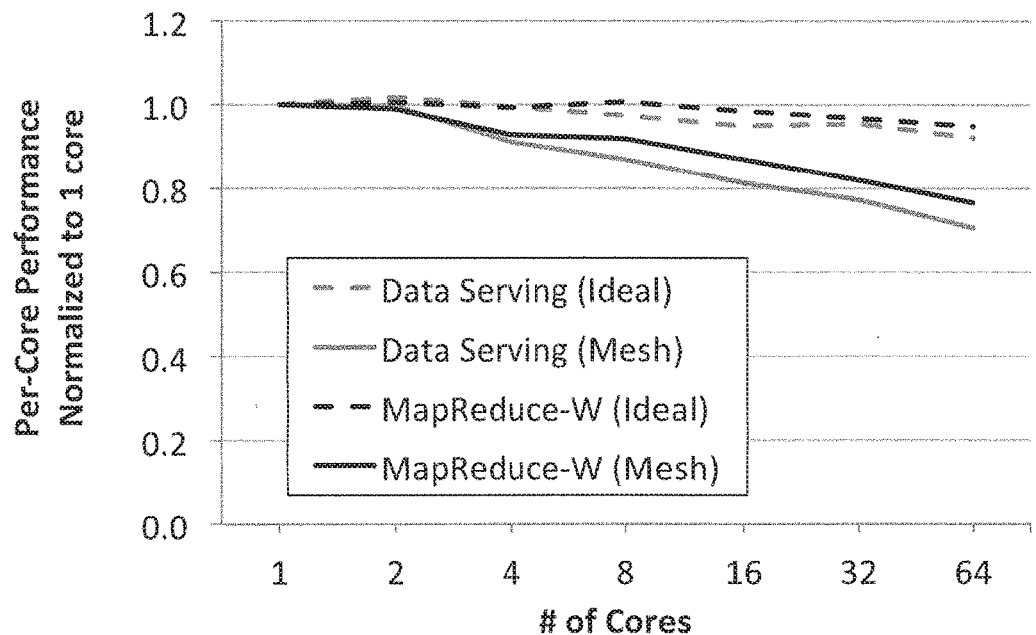
FIG. 1 shows a graph illustrating from the prior art an effect of distance on per-core performance for ideal and mesh-based interconnects on two server workloads, wherein the distance grows with core count.

Table 1 contains evaluation parameters.

DESCRIPTION OF PREFERRED
EMBODIMENTS OF THE INVENTION

General Introduction

Today's information-centric world is powered by servers. A recent report estimates the server hardware market to exceed $57 billion in 2014 (Global Server Hardware Market 2010-2014. www.technavio.com/content/global-server-hardware-market-2010-2014, 2011), with electronic commerce and online services propelling the growth. The size of the market has motivated both established and start-up hardware makers to develop specialized processors for server applications, as evidenced by designs such as Oracle's Niagara, IBM's POWER, and Tilera's Tile-GX.

Recent research (M. Ferdman, A. Adileh, O. Kocberber, S. Volos, M. Alisafaee, D. Jevdjic, C. Kaynak, A. D. Popescu, A. Ailamaki, and B. Falsafi. Clearing the Clouds: A Study of Emerging Scale-Out Workloads on Modern Hardware. In International Conference on Architectural Support for Programming Languages and Operating Systems, March 2012; N. Hardavellas, I. Pandis, R. Johnson, N. Mancheril, A. Ailamaki, and B. Falsafi. Database Servers on Chip Multiprocessors: Limitations and Opportunities. In Conference on Innovative Data Systems Research, pages 79-87, 2007) has shown that server workloads, as a class, have a set of common characteristics that differentiate them from desktop, media processing, and scientific domains. A typical server application, be it transaction processing or web search, handles a stream of independent client requests that require accessing pieces of data from a vast dataset. In many cases, only minimal processing takes place before the results are returned to the client. Despite the low computation intensity, server workloads have large active instruction footprints, typically on the order of several megabytes.

The presence of common traits—namely, (a) request independence, (b) large instruction footprints, and (c) vast dataset sizes—indicates that processors can readily be specialized for this application class. The abundant request-level parallelism argues for processor designs with a large number of cores to maximize throughput. The independent nature of requests virtually eliminates inter-thread communication activity; however, large instruction footprints require a fast communication path between the individual cores and the last-level cache (LLC) containing the applications' instructions. Finally, the vast dataset dwarfs on-die storage capacities and offers few opportunities for caching due to limited temporal reuse (N. Hardavellas, I. Pandis, R. Johnson, N. Mancheril, A. Ailamaki, and B. Falsafi. Database Servers on Chip Multiprocessors: Limitations and Opportunities. In Conference on Innovative Data Systems Research, pages 79-87, 2007). These observations are reflected in commercial server processors, such as Oracle, Niagara and Tilera Tile-GX, that feature a large number of hardware threads, modestly-sized last-level caches, and delay-optimized on-die interconnects.

Ideally, as technology scales, server processors would seamlessly scale up performance just by adding more cores. However, standing in the way of such seamless scalability is the on-die interconnect, whose cost (i.e., area) and performance overheads emerge as scalability obstacles in many-core server chips.

A common on-die interconnect design in today's many-core CMPs is a two-dimensional mesh. Our analysis shows that while a mesh-based fabric is area-efficient, it leads to poor performance on server workloads. The performance in mesh-based designs suffers as a result of a large average hop count, each hop involving a router traversal. Routers introduce delays that prolong the core stall time on instruction fetches serviced by the LLC.

To reduce NOC latency, researchers have proposed low-diameter NOC topologies, such as the flattened butterfly (J. Kim, J. Balfour, and W. Dally. Flattened Butterfly Topology for On-Chip Networks. In International Symposium on Microarchitecture, pages 172-182, December 2007), that leverage the abundant on-chip wire budget to achieve rich inter-node connectivity. By minimizing the number of router traversals, a low-diameter network improves performance over a mesh-based design by accelerating accesses to instructions cached in the LLC. However, the performance gain comes at considerable area overhead stemming from the use of many-ported routers and repeater-intensive long-range links.

The present invention addresses the problem of NOC performance and complexity through NOC-Out, an interconnect organization that matches the performance of low-diameter topologies at a fraction of the cost. The critical insight behind NOC-Out is that direct core-to-core connectivity is not necessary for server workloads whose chief characteristic is the absence of inter-thread communication.

NOC-Out eschews a direct node-to-node connectivity model found in today's NOCs. Instead, it relies on simple, routing-free request trees to carry messages from the cores to a set of centrally-located banks of the last-level cache. Each request tree is shared by a small number of cores. A node in a tree is just a buffered 2-input mux that merges packets from a local port with those already in the network. This simple organization reduces cost and delay by eliminating the need for routing, multi-port arbitration, complex switches, and deep buffers. Similarly, NOC-Out uses low-complexity reply trees to carry the data from the cache banks to the cores. A node in a reply tree is a logical opposite of that in a request tree, allowing packets to either exit the network or propagating them farther up the tree with minimal cost and delay.

We use a full-system simulation infrastructure, along with detailed area and energy models for a 32 nm technology node, to evaluate NOC-Out in the context of a 64-core CMP on a set of contemporary server workloads. Our results show that NOC-Out matches the performance of a CMP based on a flattened butterfly interconnect while reducing the area cost by a factor of 9, from a prohibitive 23 mm$^2$ to an affordable 2.5 mm$^2$. Compared to a mesh-based CMP, NOC-Out improves system performance by 17% while requiring 28% less area.

TECHNOLOGY OVERVIEW

In the following paragraphs of the present section, we first examine the characteristics of server workloads and the demands they place on processor designs. Next, we describe trends in many-core chips. Lastly, we survey principal on-die interconnect schemes and describe their implications on performance and cost in the context of many-core server processors.

Server Workloads

Research analyzing the behavior of server workloads has shown that a key set of traits holds across a wide range of applications, from traditional transaction-processing to emerging scale-out applications such as web search and media streaming (M. Ferdman, A. Adileh, O. Kocberber, S. Volos, M. Al-isafaee, D. Jevdjic, C. Kaynak, A. D. Popescu, A. Ailamaki, and B. Falsafi. Clearing the Clouds: A Study of Emerging Scale-Out Workloads on Modern Hardware. In International Conference on Architectural Support for Programming Languages and Operating Systems, March 2012; N. Hardavellas, I. Pandis, R. Johnson, N. Mancheril, A. Ailamaki, and B. Falsafi. Database Servers on Chip Multiprocessors: Limitations and Opportunities. In Conference on Innovative Data Systems Research, pages 79-87, 2007). These traits can be summarized as (a) request independence, (b) large instruction footprint, and (c) vast dataset. We next examine each of these to understand their effect on processor design.

Request Independence: Server applications handle a stream of requests that are, to an overwhelming extent, mutually independent. Fundamentally, request independence is the feature that makes server applications inherently parallel and attractive for execution on many-core chips. Another implication of request independence is the lack of inter-thread communication. Write sharing among cores working on separate requests is very rare due to the vast data working set size; nonetheless, the shared memory programming model is valued in the server domain as it simplifies software development and facilities the use of existing software stacks.

Large Instruction Footprint: Active instruction working sets in server applications are typically measured in megabytes and are characterized by complex control flow. As a result, private last-level caches tend to lack the requisite capacity for capturing the instruction footprint. Shared last-level caches, on the other hand, have the capacity and reduce replication when compared to private caches as the different cores are often executing the same application and can share instructions (N. Hardavellas, M. Ferdman, B. Falsafi, and A. Ailamaki. Reactive NUCA: Near-Optimal Block Placement and Replication in Distributed Caches. In International Symposium on Computer Architecture, pages 184-195, 2009).

One challenge with large, LLC-resident instruction working sets is that the on-die distance between the cores and the LLC adds delay to the cache access time. Because L1-I misses stall the processor, server applications are particularly sensitive to the on-die communication delays due to frequent instruction fetches from the LLC.

FIG. 1 shows the effect of distance on per-core performance for two representative server applications. In this experiment, an 8 MB LLC is shared by all cores on the die. The number of cores is indicated on the X-axis; more cores result in a larger die size and a longer average distance between each core and the target LLC bank. The figure compares the performance of an idealized interconnect (labeled "Ideal") in which only the wire delay is exposed (i.e., routing, arbitration, switching, and buffering all take 0 time) to a realistic mesh-based interconnect with a 3-cycle per-hop delay (1 cycle wire delay, 2 cycle router delay). To focus the study, we do not model contention in either network. As the figure shows, interconnect delay has a significant effect on performance that increases with core count. At 64 cores, the average difference in performance between an ideal and mesh-based interconnect is 22%.

Server applications operate on vast amounts of data that is frequently kept in DRAM to reduce the access latency. The data working set of these applications dwarfs the capacity of on-die caches. Moreover, there is essentially no temporal reuse in the data stream. The combination of these features renders on-die caches ineffective for capturing application data—Operating system data is amenable to caching, but its footprint is small—, indicating that committing large swaths of the die real-estate to cache is not useful.

To recap, server applications are best served by many-core chips featuring a modestly-sized LLC for capturing the instruction working set and an on-die interconnect optimized for low-latency core-to-cache communication.

Many-Core Server Processors

The observations captured in the previous section are reflected in several contemporary server processors. One such design are the Oracle T-series (formerly, Sun Niagara) processors. Depending on the model, the T-series features up to 16 cores, a banked LLC with 3-6 MB of storage capacity, and a delay-optimized crossbar switch connecting the cores to the cache banks.

While appropriate for a modest number of cores, the crossbar interconnect in the T-series stands as a major obstacle for scaling up the core count as crossbar area and complexity have a quadratic dependence on the number of interconnected components.

Figure 2A:
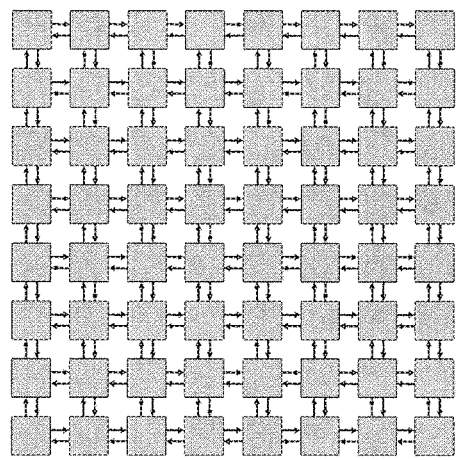
FIGS. 2(a)-2(c) show elements of tiled CMPs.
Figure 2B:
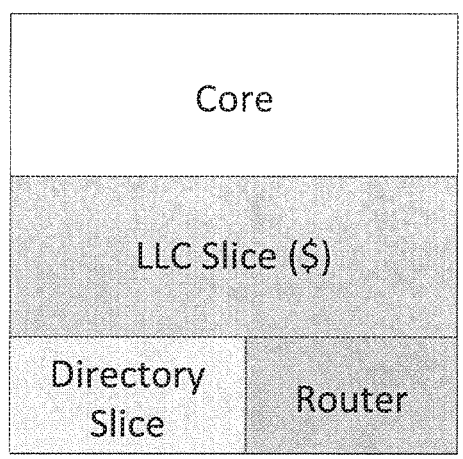
Figure 2C:
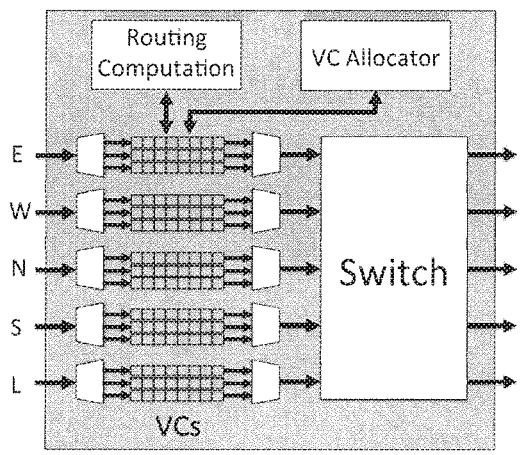

To overcome the scalability limitations of crossbar-based designs, emerging many-core processors, such as Tilera's Tile series, have adopted a tiled organization with a fully distributed last-level cache. FIG. 2(a) shows an overview of a generic CMP based on a tiled design. Each tile (FIG. 2(b)) consists of a core, one bank of the distributed last-level cache, directory slice, and a router (FIG. 2(c)). The tiles are linked via a routed, packet-based, multi-hop interconnect in a mesh topology. The tiled organization and a structured interconnect fabric allow the design to scale to large core counts without area or complexity bottlenecks of crossbar-based alternatives. In FIG. 2(c), the letters N, S, E, W, and L, reference, respectively, North, South, East, West and Local.

NOC Architectures

As noted earlier, a crossbar's cost and complexity grows quadratically with the number of interconnected elements. In contrast, a mesh-based design scales network resources in proportion to the number of tiles, lowering network cost as compared to a crossbar as the core count grows. Unfortunately, the regular structure of the mesh topology works to its disadvantage when it comes to performance scalability. Each hop in a mesh network involves a router traversal, which adds delay due to the need to access the packet buffers, arbitrate for resources, and navigate the switch. As FIG. 1 shows, in a 64-core CMP, these delays diminish the performance of a mesh-based tiled CMP by 22-% compared to an ideal fabric in which only the wire delay is exposed.

To overcome the performance drawbacks of mesh-based interconnects, researchers developed low-diameter topologies suitable for on-die implementation. These topologies use rich inter-node connectivity to bypass intermediate routers between a packet's source and destination nodes. A state-of-the-art low-diameter topology is the flattened butterfly (J. Kim, J. Balfour, and W. Daily. Flattened Butterfly Topology for On-Chip Networks. In International Symposium on Microarchitecture, pages 172-182, December 2007), shown in FIG. 3. The flattened butterfly uses a set of dedicated channels to fully connect a given node to others along the row and column. The resulting network requires, at most, two hops (one in each of the X and Y dimensions) to deliver the packet to the destination. In doing so, the flattened butterfly greatly reduces the contribution of routers to end-to-end delay, allowing performance to approach that of an ideal interconnect.

Problematically, the performance advantages of the flattened butterfly, or another richly-connected NOC, come at considerable area expense stemming from the use of many-ported routers and a multitude of links. For instance, in the flattened butterfly in FIG. 3, each router necessitates 14 network ports (7 in each of the two dimensions) plus a local port. The network ports are costly due to the presence of deep packet buffers necessary to cover the flight time of the long-range links. Meanwhile, the routers' internal switch fabric is area-intensive due the need to interconnect a large number of ports. Finally, links consume valuable on-die real-estate due to the need for frequent repeater placement (Repeaters are necessary to overcome poor RC characteristics of wires in current and future technologies), even though wires themselves can be routed over tiles.

To summarize, existing NOC architectures require an uneasy choice between performance and area-efficiency. Meanwhile, server processors demand both—good performance and good area-efficiency.

NOC-Out

NOC-Out is a low-cost, low-latency interconnect fabric optimized for the bilateral communication pattern dominant in server workloads. NOC-Out leverages two insights that allow it to minimize interconnect delays at a small area footprint.

First, NOC-Out disaggregates LLC slices from the cores into separate cache-only tiles. This enables the cache tiles to be placed in the center of the die, thereby reducing the average core-to-cache communication distance compared to a conventional tiled organization that exposes the full network diameter on LLC accesses.

Second, NOC-Out takes advantage of the communication pattern inherent in server workloads to restrict network connectivity, which enables a reduction in network cost. Specifically, NOC-Out optimizes the interconnect for core-to-cache communication and jettisons direct tile-to-tile connectivity that is the basis for contemporary NOC designs.

Figure 4:
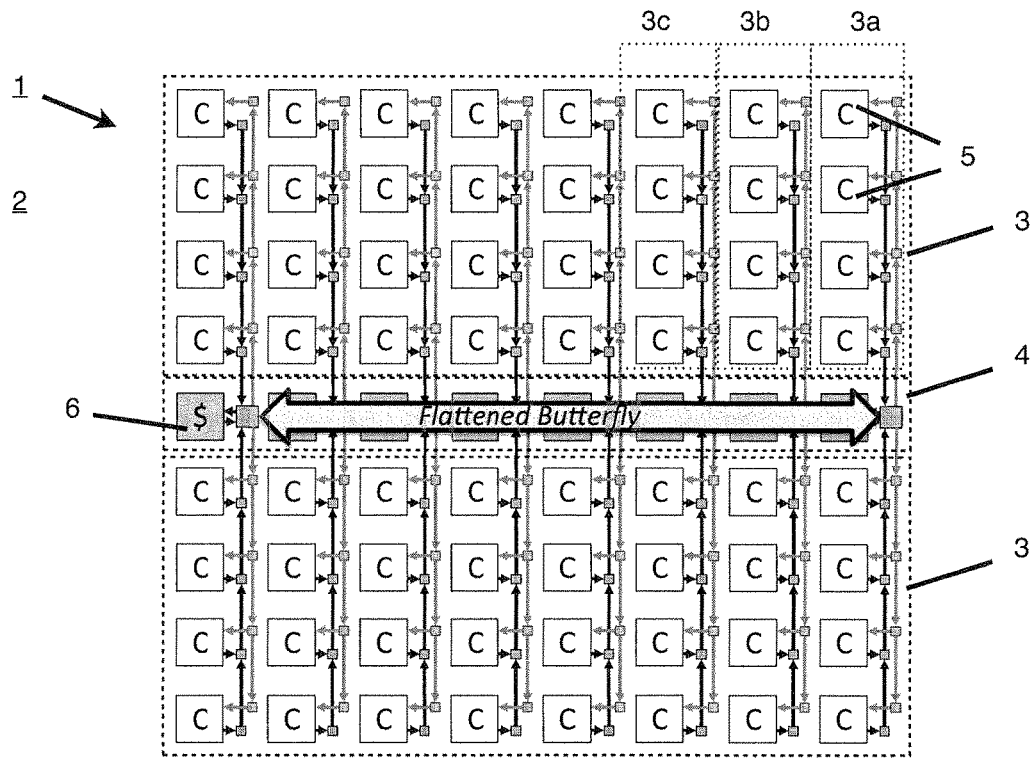
FIG. 4 shows an example of a NOC-Out organization.

FIG. 4 shows a high-level view of the proposed organization according to an example embodiment of the invention. A NOC organization 1 is realized on a die 2 which is not explicitly represented in FIG. 4. For reasons of better understanding, it can be thought that the sheet of paper on which the figure is drawn corresponds to the die 2. The die 2 has a cache area 4 and a core area 3. Core tiles 5 are arranged in the core area 3 in a plurality of subsets, three subsets of which are represented in rectangles 3a, 3b and 3c. One or more cache memory banks 6 (also known as LLC banks) are arranged in the cache area 4.

NOC-Out uses simple, routing-free request trees to guide packets toward the centralized cache memory banks 6, and reply trees, which are logical opposites of request trees, to propagate response data and coherence traffic out to the cores 5. Every request and reply tree connects a small number of cores 5 to exactly one cache memory bank 6. The cache memory banks 6 are interconnected via a low-diameter network forming a low-latency NUCA cache.

In the rest of the section, we detail the organization of the request, reply, and LLC networks.

Request Network

Figure 5A:
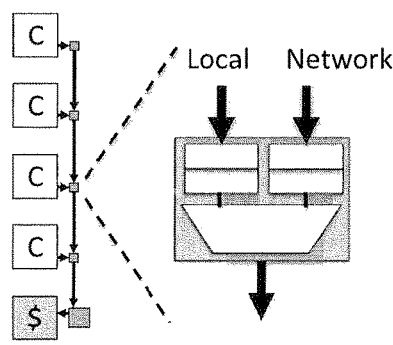
FIGS. 5(a) and 5(b) shows details of example NOC-Out networks, including a request tree (5(a)) and a reply tree (5(b))

The request network is designed for a low-latency delivery of packets from the cores 5 to the centralized cache banks. FIG. 5(a) shows key features of a request tree in an example embodiment that can be used in the NOC of FIG. 4, which spans a column of cores 5, for example the column corresponding to the subset 3a of FIG. 4, and terminates at the cache memory bank 6 at the end of the column. Effectively, a request tree is a many-to-one interconnect, with all packets that enter a request tree flowing to the same destination cache memory bank 6. A node in the tree is a buffered, flow-controlled, two-input multiplexer that merges packets from the local port with those already in the network.

Compared to a conventional packet-based NOC, the request network does not require routing, as all packets flow to a common destination. The switch, typically implemented as a crossbar or a mux tree in conventional NOCs, is reduced to a simple two-input mux in a request tree. The request network is similar to conventional NOCs in that it benefits from the use of virtual channels for protocol deadlock avoidance, and as such requires a virtual channel allocation mechanism. However, with just two ports (local and network), the VC allocator is trivially simple. In fact, given the low memory-level parallelism of scale-out workloads (M. Ferdman, A. Adileh, O. Kocberber, S. Volos, M. Alisafaee, D. Jevdjic, C. Kaynak, A. D. Popescu, A. Ailamaki, and B. Falsafi. Clearing the Clouds: A Study of Emerging Scale-Out Workloads on Modern Hardware. In International Conference on Architectural Support for Programming Languages and Operating Systems, March 2012), static-priority arbitration policies that always prioritize the network over the local port (or vice-versa) tend to work well and afford further simplification of the arbitration logic.

NOC-Out distinguishes three message classes—data requests, snoop requests, and responses (both data and snoop)—to guarantee network-level deadlock freedom for its coherence protocol. Of these, only data requests and responses travel through the request trees, as snoop requests can only originate at the directory nodes at the LLC. As a result, each port in a request tree has two virtual channels, one per message class.

Upon arrival at a router in a request tree, a packet is buffered in the appropriate VC (determined by the packet's message class). With a total of four VCs in a router (two ports with two VCs per port), a 4:1 arbiter selects a winning VC based on priority and downstream buffer availability. In this work, we assume the following fixed priority ordering of VCs (highest to lowest): network responses, local responses, network requests, local requests. By prioritizing the network over the local port, we seek to mitigate the latency disadvantage of cores that are more distant from the LLC. Because a request tree router has exactly one output port, routing and output port selection logic is unnecessary, and just one arbiter is required per node.

Reply Network

Figure 5B:
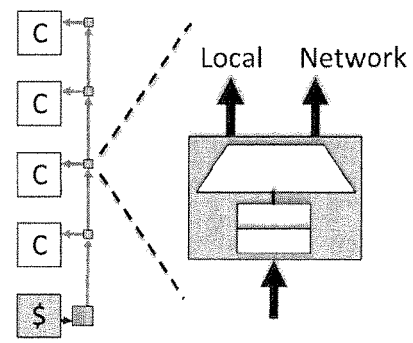

The reply network carries packets (data responses and snoop requests) from the cache memory bank 6 to the cores 5. FIG. 5(*b*) shows a logical view of a reply tree in an example embodiment that can be used in the NOC of FIG. 4. A reply tree is a logical opposite of the request tree, with a single source (a cache memory bank 6) and multiple destinations (cores 5). Each node in a tree is a buffered, flow-controlled demultiplexer that selects a local output port for packets that have reached their destination or propagates them farther up the tree toward the next node.

As is the case with the request network, virtual channels are necessary for deadlock avoidance to guarantee that snoop requests do not block data responses from reaching their destination. With two VCs per node (one per message class), on each clock cycle, simple control logic (1) uses message priority and buffer availability to select a winning VC, and (2) sets up demux control to forward a flit from the selected VC to the local or network output. Again, we use a static priority assignment to prioritize reply messages over snoop requests, subject to buffer availability.

LLC Network

As noted earlier, NOC-Out desegregates core and cache slices (A cache slice is composed of data, tags, and directory) into separate tiles. Desegregation allows the LLC to be placed in the center of the die, thereby reducing the average communication distance between the cores and the cache.

As each core connects to just one LLC tile via its request and reply trees, NOC-Out relies on a dedicated low-diameter network to route traffic between LLC tiles. The choice of the network (flattened butterfly) is motivated by the need to minimize delay and reduce contention in the LLC region. In order to reduce the area and channel expense of the flattened butterfly, NOC-Out takes advantage of the fact that the number of LLC tiles need not match the number of core tiles and, in fact, can be made much smaller with no performance impact by internally banking each LLC tile. A reduction in the number of the LLC tiles diminishes the cost of the richly-connected LLC network and localizes it to a small region of the die. Meanwhile, the rest of the die enjoys reduced cost and complexity with no core-to-core connectivity and a light-weight core-to-cache interconnect based on request and reply trees.

Additional Considerations

Before concluding the description of NOC-Out, we highlight several additional aspects of the proposed design; namely, its flow control architecture, connectivity to off-die interfaces, and support for shared memory.

Flow Control: All three NOC-Out networks (request, reply, and LLC) rely on conventional virtual channel credit-based flow control. The amount of buffering per port in both request and reply trees is insignificant (a few flits per VC) thanks to a short round-trip credit time resulting from a trivial pipeline. The flattened butterfly LLC network requires more buffering per port to cover the multi-cycle delays of long-range links and multi-stage routers; however, this cost is restricted to just a fraction of the nodes.

Off-Die Interfaces: Contemporary server chips integrate a number of off-die interfaces, such as memory controllers, to improve performance and reduce system cost. In the NOC-Out design, these are accessed through dedicated ports in the edge routers of the LLC network, as shown in FIG. 5.

Shared Memory: Shared memory is a prominent feature of today's software stacks. Despite being optimized for the bilateral core-to-cache communication, NOC-Out fully supports the shared memory paradigm through conventional hardware coherence mechanisms, preserving full compatibility with existing software. What NOC-Out sacrifices by eliminating direct core-to-core connectivity is the support for locality-optimized communication. Instead, NOC-Out specializes for cost and performance on scale-out server workloads that do not benefit from locality optimizations.

Methodology

Our evaluation focuses on a 64-core CMP implemented in 32 nm technology. Table 1 summarizes the key elements of the methodology, while the following sections detail the specifics of the evaluated systems, technology parameters, workloads, and simulation infrastructure.

CMP Parameters

Our target CMP features 64 cores, 8 MB of last-level cache, and four DDR3-1667 memory channels. The cores are modeled after an ARM Cortex-A15, a three-way out-of-order design with 32 KB L1-I and L1-D caches. Cache line size is 64B.

We consider three system organizations, as follows:

Mesh: Our baseline for the evaluation is a mesh-based tiled CMP, as shown in FIG. 2. The 64 tiles are organized as an 8-by-8 grid, with each tile containing a slice of the LLC and a directory node.

At the network level, a mesh hop consists of a single-cycle link traversal followed by a two-stage router pipeline for a total of 3 cycles per hop at zero load. The router performs routing, VC allocation, and speculative XB allocation in the first cycle, followed by XB traversal in the next cycle. Each router port has 3VCs to guarantee deadlock freedom among three message classes: data requests, coherence requests, and responses. Each VC is 5 flits deep, which is the minimum necessary to cover the round-trip credit time.

Figure 3:
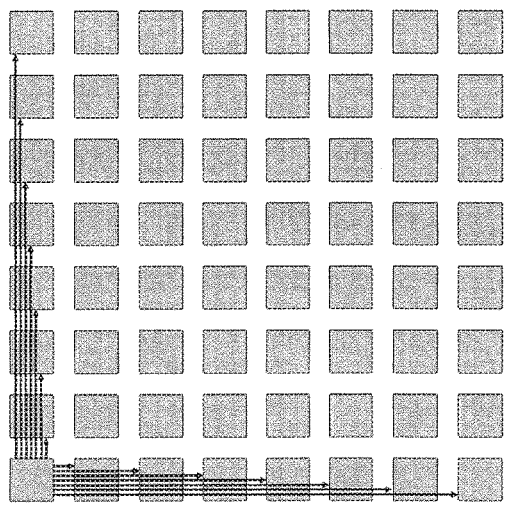
FIG. 3 shows a flattened butterfly topology, wherein links from only one node are shown for clarity.

Flattened Butter (FBfly): The FBfly-based CMP has the same tiled organization as the mesh baseline, but enjoys rich connectivity afforded by the flattened butterfly organization as shown in FIG. 3. Each FBfly router has 14 network ports (7 per dimension) plus a local port. Due to high arbitration complexity, the router does not employ speculation, resulting in a three-stage pipeline. Each router port has 3 VCs to guarantee deadlock freedom. The number of flits buffers per VC is optimized based on the location of the router in the network to minimize buffer requirements. Finally, the link delay is proportional to the distance spanned by the link. Given our technology parameters (detailed below) and tile dimensions, a flit in the channel can cover up to 2 tiles in a single clock cycle.

NOC-Out: Our proposed design, described herein above, desegregates core and cache tiles, and places the LLC in the center of the die. To connect cores to the LLC, NOC-Out uses specialized request and reply networks. Direct inter-core connectivity is not supported and all traffic must flow through the LLC region.

Both the request and reply networks require just 2 VCs per port. In the request network, only data requests and replies flow from the cores to the cache, as coherence requests cannot originate at the core files. Similarly, the response network only needs to segregate coherence requests and replies, as data requests cannot originate at the LLC. In the absence of contention, both networks have a single-cycle per-hop delay, which includes traversal of both the link and the arbitrated mux (in the request tree) or demux (in the reply tree). This delay is derived based on the technology parameters and tile dimensions.

The LLC is organized as a single row of tiles, with each tile containing 1 MB of cache and a directory slice. The aspect ratio of the LLC tiles roughly matches that of the core tiles, allowing for a regular layout across the die, as shown in FIG. 4. LLC tiles are internally banked to maximize throughput. For the evaluation, we assume 2 banks per tile (16 LLC banks, in total), as our simulations show that this configuration achieves similar throughput at lower area cost as compared to designs with higher degrees of banking. The eight LLC tiles are fully connected via a one-dimensional flattened butterfly. LLC routers feature a 3-stage non-speculative pipeline, with 3 VCs per input port.

Technology Parameters

We use publicly available tools and data to estimate the area and energy of the various network organizations. Our study targets a 32 nm technology node with an on-die voltage of 0.9V and a 2 GHz operating frequency.

We use custom wire models, derived from a combination of sources (J. D. Balfour and W. J. Dally. Design Tradeoffs for Tiled CMP On-Chip Networks. In International Conference of Supercomputing, pages 187-198, June 2006; International technology roadmap for semiconductors (ITRS), 201), to model links and router switch fabrics. For links, we model semi-global wires with a pitch of 200 nm and power-delay-optimized repeaters that yields a link latency of 125 ps/mm. On random data, links dissipate 50 fJ/bit/mm, with repeaters responsible for 19% of link energy. For area estimates, we assume that link wires are routed over logic or SRAM and do not contribute to network area; however, repeater area is accounted for in the evaluation.

Our buffer models are taken from ORION 2.0 (A. Kahng, B. Li, L.-S. Peh, and K. Samadi. ORION 2.0: A Fast and Accurate NoC Power and Area Model for Early-Stage Design Space Exploration. InDesign, Automation, and Test in Europe, pages 423-428, April 2009). We model flip-flop based buffers for mesh and NOC-Out, as both have relatively few buffers per port. For the flattened butterfly, we assume SRAM buffers that are more area- and energy-efficient that flip-flops for large buffer configurations.

Cache area, energy, and delay parameters are derived via CACTI 6.5 (N. Muralimanohar, R. Balasubramonian, and N. Jouppi. Optimizing NUCA Organizations and Wiring Alternatives for Large Caches with CACTI 6.0. In International Symposium on Microarchitecture, pages 3-14, December 2007). A 1-MB slice of the LLC has an area of 3.2 mm$^2$ and dissipates on the order of 500 mW of power, mostly due to leakage.

Finally, parameters for the ARM Cortex-A15 core are borrowed from Microprocessor Report and scaled down from the 40 nm$^2$ technology node to the 32 nm target. Core area, including L1 caches, is estimated at 2.9 mm$^2$. Core power is 1.05 W at 2 GHz. Core features include 3-way decode/issue/commit, 64-entry ROB, and 16-entry LSQ.

Workloads

We use contemporary server workloads taken from CloudSuite (CloudSuite 1.0parsa.epfl.ch/cloudsuite, 2012). The workloads include Data Serving, MapReduce, Web Frontend, SAT Solver, and Web Search. We consider two MapReduce workloadstext classification (MapReduce-C) and word count (MapReduce-W). For the Web Frontend workload, we use the e-banking option from SPECweb2009 in place of its open-source counterpart from CloudSuite, as SPECweb2009 exhibits better performance scalability at high core counts. Two of the workloads—SAT Solver and MapReduce—are batch, while the rest are latency-sensitive and are tuned to meet the response time objectives. Prior work (M. Ferdman, A. Adileh, O. Kocberber, S. Volos, M. Alisafaee, D. Jevdjic, C. Kaynak, A. D. Popescu, A. Ailamaki, and B. Falsafi. Clearing the Clouds: A study of Emerging Scale-Out workloads on Modern Hardware. In International Conference on Architectural Support for Programming Languages and Operating Systems, March 2012) has shown that these applications have characteristics representative of the broad class of server workloads as described herein above.

Simulation Infrastructure

We estimate the performance of the various processor designs using Flexus full-system simulation (T. Wenisch, R. Wunderlich, M. Ferdman, A. Ailamaki, B. Falsafi, and J-Hoe. SimFlex: Statistical sampling of Computer System Simulation. IEEE Micro, 26:18-31, July-August 2006). Flexus extends the Virtutech Simics functional simulator with timing models of cores, caches, on-chip protocol controllers, and interconnect. Flexus models the SPARC v9 ISA and is able to run unmodified operating systems and applications.

We use the ratio of the number of application instructions committed per cycle to the total number of cycles (including the cycles spent executing operating system code) to measure performance; this metric has been shown to accurately reflect overall system throughput (T. Wenisch, R. Wunderlich, M. Ferdman, A. Ailamaki, B. Falsafi, and J-Hoe. SimFlex: Statistical sampling of Computer System Simulation. IEEE Micro, 26:18-31, July-August 2006). Performance measurements are computed with 95% confidence with an average error of less than 4%.

Evaluation

We first examined system performance and area efficiency of mesh, flattened butterfly, and NOC-Out designs given a fixed 128-but link bandwidth. We then present an area-normalized performance comparison, followed by a discussion of power trends.

System Performance

Figure 6:
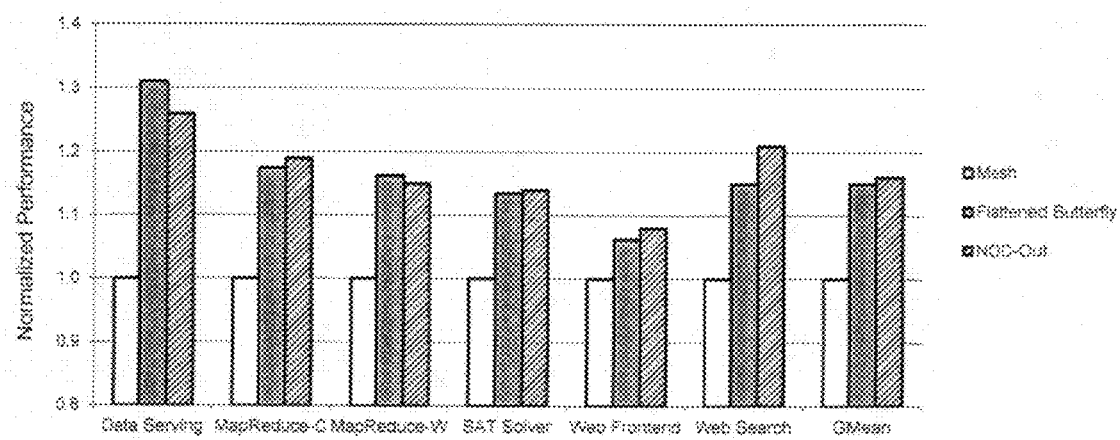
FIG. 6 contains a graph showing system performance, normalized to a mesh-based design.

FIG. 6 shows full system performance, normalized to the mesh, under the various NOC organizations. Compared to the mesh, the richly-connected flattened butterfly topology improves performance by 7-31%, with a geomean of 17%. The highest performance gain is registered on the Data Serving application, which is characterized by very low ILP and MLP, making it particularly sensitive to the LLC access latency.

On average, the proposed NOC-Out design matches the performance of the bank contention is responsible for a small performance degradation in NOC-Out, resulting in lower performance as compared to the flattened butterfly. On the other hand, on Web Search, NOC-Out enjoys a smaller average communication distance between cores and the LLC, resulting in higher performance. The bottom line is that NOC-Out improves system performance by 17% over the mesh, same as the flattened butterfly.

We conclude the performance assessment by noting that while the bisection bandwidths of the various topologies are different, the networks are not congested. Differences in latency, not bandwidth, across the topologies are responsible for the performance variations.

NOC Area

Figure 7:
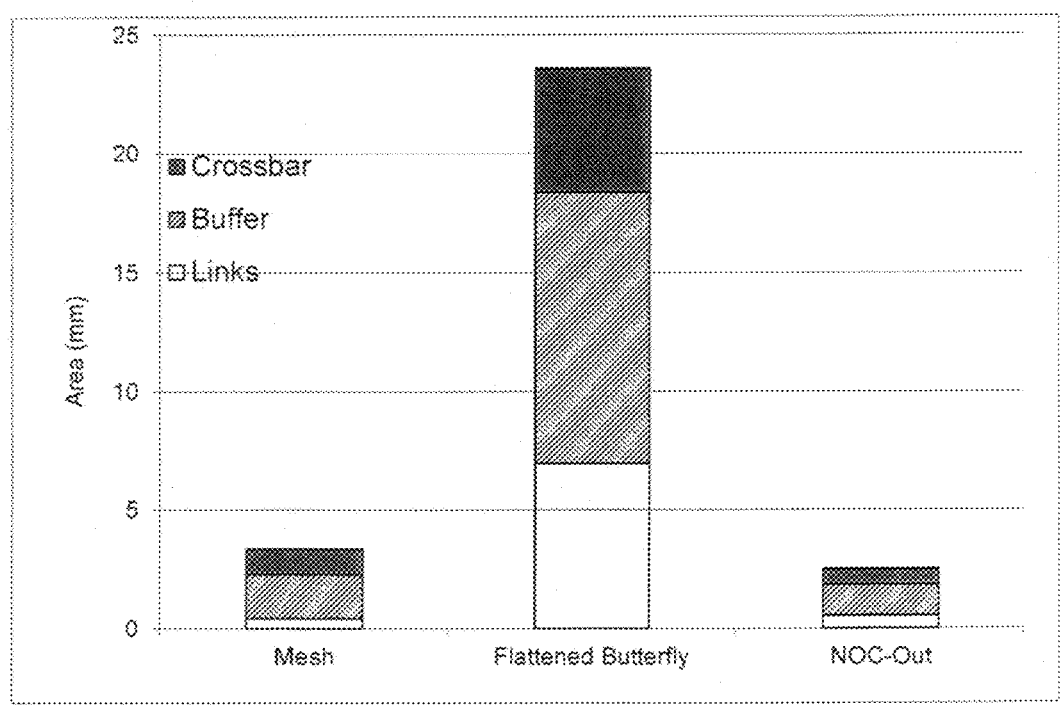
FIG. 7 contains a graph showing NOC area breakdown.

FIG. 7 breaks down the NOC area of the three organizations by links, buffers, and crossbars. Only repeaters are accounted for in link area, as wires are assumed to be routed over tiles.

At over 23 mm$^2$, the flattened butterfly has the highest NOC area, exceeding that of the mesh by nearly a factor of 7. The large footprint of the flattened butterfly is due to its large link budget and the use of buffer-intensive many-ported routers.

NOC-Out's footprint of 2.5 mm$^2$ is the lowest among the evaluated designs, requiring 28% less area than a mesh and over 9 times less area than a flattened butterfly. The savings are due to the use of low-complexity network trees (request and reply) that simultaneously lower link requirements and router costs. Each of the two tree networks contributes just 18% to the total NOC footprint. In contrast, the flattened butterfly interconnecting NOC-Out's LLC region constitutes 64% of the total network area while linking just 11% of the tiles.

Area-Normalized Comparison

The performance and area analysis in the previous two sections assumed a fixed link width of 128 bits, resulting in vastly different NOC area costs and bisection bandwidths. To better understand how the various designs compare given a fixed budget, we assess the performance of the mesh and flattened butterfly using NOC-Out's area of 2.5 mm$^2$ as a limiting constraint.

Figure 8:
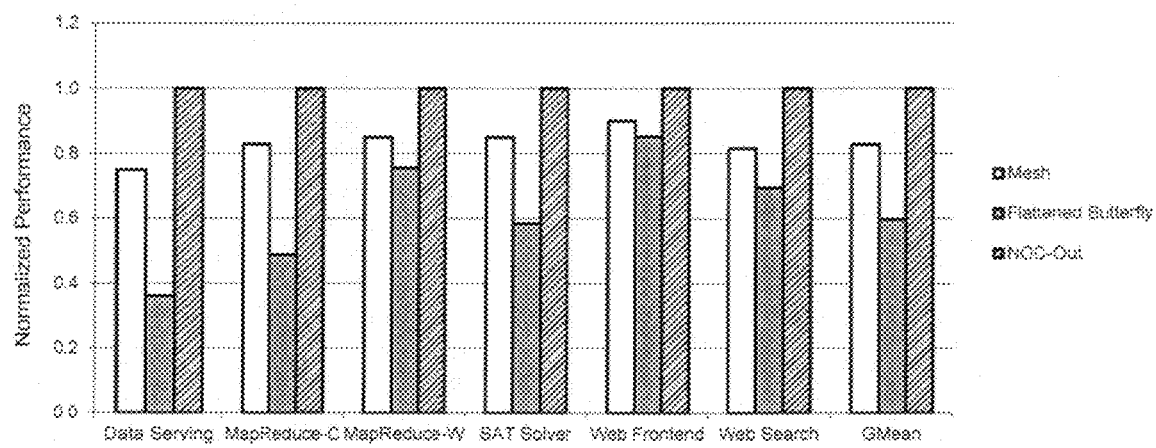
FIG. 8 contains a graph showing system performance given a fixed NOC area budget, whereby performance is normalized to NOC-Out.

FIG. 8 summarizes the results of the study, with performance of the three organizations normalized to that of NOC-Out. Not surprisingly, given a smaller area budget, the performance of both mesh and flattened butterfly degrades. The degradation is most apparent in the richly-connected flattened butterfly, which sees its linl bandwidth shrink and the serialization delay increase by a factor of 7. Compared to the flattened butterfly at the same area budget, NOC-Out enjoys a 65% performance advantage. Compared to the mesh, NOC-Out's performance edge is 19%.

Power Analysis

Our analysis shows that the NOC is not a significant consumer of power at the chip level. For all three organizations, NOC power is below 2 W. In contrast, cores alone consume in excess of 60 W. Low ILP and MLP of server workloads is the main reason for the low power consumption at the NOC level. Another reason is the lack of coherence activity in these applications.

NOC-Out is the most energy-efficient NOC design, dissipating 1.3 W of power, on average. Mesh and flattened butterfly average 1.8 W and 1.6 W, respectively. NOC-Out's higher efficiency stems from the lower average distance between the cores and the LLC. Meanwhile, the flattened butterfly's rich connectivity gives it an advantage over the mesh. In all cases, most of the energy is dissipated in the links.

SUMMARY

The evaluation results show that NOC-Out offers the performance of the richly-connected flattened butterfly topology at a fraction of the cost. Whereas the flattened butterfly requires a prohibitive 23 mm$^2$ of die real-estate, NOC-Out necessitates just 2.5 mm$^2$. When constrained to NOC-Out's area budget, the performance of the flattened butterfly diminishes, giving NOC-out a 65% performance advantage. In comparison to a mesh, NOC-Out improves performance by 17% and reduces the area footprint by 28%. Finally, NOC-Out offers better energy-efficiency than alternative topologies by reducing the average distance to the last-level cache.

Discussion

Scalability of NOC-Out

So far, our description and evaluation of NOC-Out has been in the context of a 64-core CMP. NOC-Out can be readily scaled to support larger numbers of cores through the use of concentration and, in configurations featuring hundreds of cores, through judicious use of express channels in request and reply networks. If necessary, the LLC network can be scaled up by extending its flattened butterfly interconnect from one to two dimensions. We now briefly discuss each of these options.

Concentration: Concentration can be used to reduce the network diameter by aggregating multiple terminals (e.g., cores) at each router node (J. D. Balfour and W. J. Dally. Design Tradeoffs for Tiled CMP On-Chip Networks. In International Conference on Supercomputing, pages 187-198, June 2006). In the case of request and reply networks, a factor of two concentration at each node (i.e., two adjacent cores sharing a local port of the mux/demux) could be used to support twice the number of cores of the baseline design at nearly the same network area cost. With four times more nodes in the network and a concentration factor of four, we find that the 16B links in the tree networks are bottlenecked by insufficient bandwidth, necessitating either additional or wider links.

Express Links: In future CMPs with hundreds of cores, the height of the request and reply trees may become a concern from a performance perspective. To mitigate the tree delay, express links can be judiciously inserted into the tree to bypass some number of intermediate nodes, allowing performance to approach that of an "ideal" wire-only network. While express links increase the cost of the network due to greater channel expense, they are compatible with the simple node architectures described in herein above and do not necessitate the use of complex routers.

Flattened Butterfly in LLC: when executing server workloads, much of the useful LLC content is the instruction footprint and OS data. Because this content is highly amenable to sharing by all the cores executing the same binary, adding cores to a server processor does not mandate additional LLC capacity. Should the need arise, however, to expand the LLC beyond a single row of tiles, the flattened butterfly network interconnecting the tiles can be readily scaled from one to two dimensions. While an expanded flattened butterfly increases the cost of NOC-Out, the expense is confined to the fraction of the die occupied by the LLC.

Comparison to Prior Work

NOC-Out is not the first attempt to specialize the on-chip interconnect to a specific application domain. Bakhoda et al. proposed a NOC design optimized for GPU-based throughput accelerators (A. Bakhoda, J. Kim, and T. M. Aamodt. Throughput-Effective On-Chip Networks for Manycore Accelerators. In International Symposium on Microarchitecture, pages 421-432, 2010). Significant similarities and differences exist between the two efforts. Both designs address the needs of thread-rich architectures characterized by a memory-resident data working set and a many-to-few-to-many communication pattern. But whereas applications running on throughput accelerators are shown to be insensitive to NOC latency, we show server workloads to be highly sensitivity to interconnect delays due to frequent instruction fetches from the LLC. As a result, NOC-Out innovates in the space of delay-optimized on-chip topologies, whereas prior work has focused on throughput and cost in the context of meshes.

One effort aimed at boosting NOC efficiency specifically in the context of server processors was CCNoC, which proposed a dual-mesh interconnect with better cost-performance characteristics than existing multi-network alternatives (S. Volos, C. Seiculescu, B. Grot, N. Khosro Pour, B. Falsafi, and G. De Micheli. CCNoC: Specializing On-Chip Interconnects for Energy Efficiency Cache-Coherent Servers. In International Symposium on Networks-on-Chips, 2012). Our work shows that mesh-based designs are suboptimal from a performance perspective in many-core server processors.

A number of earlier studies sought to reduce NOC area cost and complexity through microarchitectural optimizations in crossbars (J. Kim. Low-cost Router Microarchitecture for On-Chip Networks. In International Symposium on Microarchitecture, pages 255-266, 2009; H. Wang, L.-S. Peh, and S. Malik. Power-driven Design of Router Microarchitectures in On-chip Networks. In International Symposium on Microarchitecture, pages 105-116, December 2003), buffers (T. Moscibroda and O. Mutlu. A Case for Bufferless Routing in On-Chip Networks. In International Symposium on Computer Architecture, pages 196-207, 2009), and links (G. Michelogiannakis, J. Balfour, and W. Dally. Elastic-Buffer Flow Control for On-Chip Networks. In International Symposium on High-Performance Computer Architecture, pages 151-162, February 2009). A recent study examined challenges of NOC scalability in kilo-node chips and proposed an interconnect design that co-optimized buffering, topology, and flow control to reduce NOC area and energy (B. Grot, J. Hestness, S. W. Keckler, and O. Mutlu. Kilo-NOC: A Heterogeneous Network-on-Chip Architecture for Scalability and Service Guarantees. International Symposium on Computer Architecture, pages 268-279, June 2011). All of these efforts assume a conventional tiled organization. In contrast, our NOC-Out design lowers NOC area overheads by limiting the extent of on-die connectivity. However, NOC-Out's efficiency can be further improved by leveraging many of the previously proposed optimizations.

Finally, Huh et al. preceded NOC-Out in proposing a desegregated NUCA CMP architecture in which cache and processor tiles are disjoint (J. Huh, C. Kim, H. Shafi, L. Zhang, D. Burger, and S. W. Keckler. A NUCA Substrate for Flexible CMP Cache Sharing. In International Conference on Supercomputing, pages 31-40, 2005). Our design is different from Huh's in that it seeks to reduce the number of cache tiles to lower network cost, whereas Huh relied on a sea of cache tiles to optimize data placement and partitioning.

CONCLUSION

Server processors stand to benefit from increasing transistor densities by integrating more cores to process independent requests abundant in server workloads. Standing in the way of seamless performance scale-up resulting from additional cores is the on-die interconnect that adds considerable delay on instruction fetches serviced by the last-level cache. The performance penalty is particularly acute in mesh-based networks that require a large number of router traversals on a typical LLC access. While a low-diameter flattened butterfly topology overcomes the performance bottleneck of meshes, it incurs a high area overhead through the use of many-ported routers and repeater-intensive long-range links.

In this work, we introduced NOC-Out, an interconnect architecture specialized to the demands of server workloads. To reduce distance to the LLC, NOC-Out desegregates LLC banks from core tiles and places the cache in the center of the die. NOC-Out optimizes the core-to-cache interconnect through the use of low-cost and low-delay network trees that take advantage of the bilateral communication pattern between the cores and the LLC. Finally, NOC-Out improves the cost-performance characteristics of the intra-LLC interconnect by reducing the number of LLC tiles and interconnecting them via a low-diameter topology. These optimizations enable an interconnect fabric that matches the performances of a flattened butterfly at the cost of a mesh.

The invention claimed is:

1. A Network-On-Chip (NOC) comprising:
   a die having a cache area and a core area,
   a plurality of core tiles arranged in the core area in a plurality of subsets,
   at least one cache memory bank arranged in the cache area, the at least one cache memory bank is distinct from each of the plurality of core tiles, and
   an interconnect fabric comprising:
      a routing-free request tree to connect to a first cache memory bank of the at least one cache memory bank, each core tile of a first one of the subsets, the first subset corresponding to the first cache memory bank, wherein the routing-free request tree forms a many-to-one interconnect such that every core tile of the first subset is connected to the first cache memory bank only, to allow each data packet sent by the core tiles of the first subset to only be received by the same first cache memory bank, and wherein the routing-free request tree comprises a plurality of request nodes, each one of which is a two-input multiplexer that merges data packets from the first input and the second input and outputs a multiplexed stream of data packets, and
      a reply tree, separate from the routing-free request tree, to connect the first cache memory bank to each core tile of the first subset, and allow guiding data packets from the first cache memory bank to a core tile of the first subset.

2. The NOC of claim 1, wherein each subset of core tiles corresponds to only one cache memory bank.

3. The NOC of claim 1, wherein the cache area contains two or more cache memory banks which are connected among themselves.

4. The NOC of claim 3, wherein the cache memory banks are connected by a flattened butterfly network architecture.

5. The NOC of claim 1, wherein at a first request node of the plurality of request nodes, a first two-input multiplexer comprises
   a buffer to receive first data packets from a first core tile at its first input,
   a first multiplexed stream of data packets at its second input, from a second two-input multiplexer located at a second request node, and
   a port to output a resulting stream of data packets to the first cache memory bank, at the second request node, the second two-input multiplexer comprises
   a buffer to receive second data packets from a second tile at its first input,
   a second multiplexed stream of data packets at its second input, from a third two-input multiplexer located at a third request node, or
   third data packets from a third core tile at its second input, depending on the case if the first subset comprises more than three core tiles or not, and a port to output the first multiplexed stream of data packets.

6. The NOC of claim 1, wherein each two-input multiplexer implements a static-priority arbitration policy that prioritizes the output of the data packets received at the first input over the data packets received at the second input.

7. The NOC of claim 1, wherein the reply tree comprises a plurality of reply nodes, each one of which is a single input demultiplexer that demultiplexes an input multiplexed stream of data packets and propagates a data packet therefrom to a first output connected to one of the core tiles of the first subset if the packet has reached its destination or propagates it to a second output otherwise.

8. The NOC of claim 7, further comprising
at a first reply node of the plurality of reply nodes, a first single input demultiplexer which comprises
a buffer to receive a first reply multiplexed stream of data packets from the first cache memory bank, and
a logic to determine whether a packet in the first reply multiplexed stream has reached its destination at the first reply node, the destination corresponding to the core tile connected to the first output,
a port to output the packet to the first output if the packet has reached its destination,
a mulitplexer to multiplex the remaining packets in a second reply multiplexed stream, and
a port to output the second reply multiplexed stream to the second output,
at a second reply node, a second single input demultiplexer, which is configured in a similar manner as the first single input demultiplexer notably with respect to a further core tile connected to its first output, and either a third single input demultiplexer or an even further core tile connected to its second output depending on the case if the first subset comprises more than three core tiles or not.

9. The NOC of claim 7, wherein each single input demultiplexer implements a static-priority reply arbitration policy that prioritizes the output of the data packets received at the single input.

10. The NOC of claim 1, wherein the cache area divides a total area of the die in two substantially equally sized areas, and the core area is located in the two substantially equally sized areas to surround the cache area.

11. The NOC of claim 10, wherein the cache area has a rectangular shape in which the at least one cache memory banks are aligned according to the elongated direction of the rectangular shape, and for each subset, the core tiles making up the subset at aligned along a direction perpendicular to the elongated direction of the rectangular shape.

12. The NOC of claim 1, wherein the cache area corresponds to central area located substantially in the geometrical middle of the die.

13. The NOC of claim 1, wherein the routing-free request tree uses virtual channels for protocol deadlock avoidance.

* * * * *